United States Patent
Okazaki et al.

(10) Patent No.: US 8,160,789 B2
(45) Date of Patent: Apr. 17, 2012

(54) CONTROL DEVICE FOR VEHICLE AND CONTROL METHOD THEREOF

(75) Inventors: Seiji Okazaki, Utsunomiya (JP); Goh Endoh, Yokohama (JP)

(73) Assignee: JATCO Ltd, Fuji-shi (JP)

( * ) Notice: Subject to any disclaimer, the term of this patent is extended or adjusted under 35 U.S.C. 154(b) by 418 days.

(21) Appl. No.: 12/548,926

(22) Filed: Aug. 27, 2009

(65) Prior Publication Data

US 2010/0057311 A1    Mar. 4, 2010

(30) Foreign Application Priority Data

Sep. 4, 2008   (JP) .................................. 2008-227057

(51) Int. Cl.
    *G06F 17/00*  (2006.01)
(52) U.S. Cl. ............ 701/54; 701/104; 701/112; 477/54; 477/65
(58) Field of Classification Search ............ 701/54, 701/104, 112; 477/65, 54, 154
    See application file for complete search history.

(56) References Cited

U.S. PATENT DOCUMENTS

| 6,934,610 | B2 * | 8/2005 | Wakashiro et al. ............. 701/22 |
| 7,366,601 | B2 * | 4/2008 | Ayabe et al. .................... 701/51 |
| 7,526,375 | B2 * | 4/2009 | Buslepp et al. ............... 701/112 |
| 2009/0075779 | A1 * | 3/2009 | Kumazaki et al. ............... 477/3 |

FOREIGN PATENT DOCUMENTS

| JP | 6-37931 B2 | 5/1994 |
| JP | 11-094061 A | 4/1999 |
| JP | 2004-169867 A | 6/2004 |
| JP | 2004-183757 A | 7/2004 |
| JP | 2005-172078 A | 6/2005 |

\* cited by examiner

*Primary Examiner* — Thomas Black
*Assistant Examiner* — Shardul Patel
(74) *Attorney, Agent, or Firm* — Foley & Lardner LLP

(57) ABSTRACT

When a downshift is performed while a vehicle travels in a coasting state, a determination is made as to whether or not a fuel cut recovery will be performed. When a fuel cut recovery will be performed, an offset oil pressure is set and an initial oil pressure set after raising an oil pressure of an engagement side frictional engagement element to a pre-charge oil pressure is set at an oil pressure obtained by subtracting the offset oil pressure from a reference initial oil pressure.

12 Claims, 11 Drawing Sheets

| | B1 Fr/B | C1 I/C | C2 D/C | C3 H&LR/C | B2 LOW/B | B3 2346/B | B4 R/B | F1 | F2 |
|---|---|---|---|---|---|---|---|---|---|
| 1st | (○) | | | (○) | ○ | | | ○ | ○ |
| 2nd | | | | (○) | ○ | ○ | | | ○ |
| 3rd | | | ○ | | ○ | ○ | | | |
| 4th | | | ○ | ○ | | ○ | | | |
| 5th | | ○ | ○ | ○ | | | | | |
| 6th | | ○ | | ○ | | ○ | | | |
| 7th | ○ | ○ | | ○ | | | | ○ | |
| Rev. | ○ | | | ○ | | | ○ | | |

CONTROL DEVICE FOR VEHICLE AND CONTROL METHOD THEREOF

TECHNICAL FIELD OF THE INVENTION

This invention relates to a control device for a vehicle.

BACKGROUND OF THE INVENTION

In JP6-37931A, when a downshift is performed in an automatic transmission while a vehicle is in a coasting state, a comparatively high oil pressure is supplied to an engagement side frictional engagement element to accelerate an engagement side piston stroke. A low oil pressure (to be referred to hereafter as an initial oil pressure) is then supplied to end the stroke. The oil pressure of the engagement side frictional engagement element is then raised from the initial oil pressure such that the downshift in the automatic transmission is completed through a torque phase and an inertia phase.

SUMMARY OF THE INVENTION

A downshift may be performed in a coasting state under various operating conditions, for example during a fuel cut performed when an engine rotation speed is in a comparatively high rotation speed region or during a fuel cut recovery when the engine rotation speed is in a comparatively low rotation speed region.

However, in the invention described above, the initial oil pressure immediately following the supply of the comparatively high oil pressure is set uniformly in relation to the type of shift or the type of the friction element to be engaged, regardless of the operating conditions.

For example, following a fuel cut recovery, a reverse driving force is smaller than during a fuel cut, and an output shaft torque is close to zero. Therefore, shift shock is favorable when the initial oil pressure is set such that the oil pressure for ending the piston stroke can be commanded appropriately and the commanded oil pressure is supplied from an actuator. However, the actual oil pressure may vary in relation to the command, and even when learning or the like is performed to prevent such variation, if the oil pressure does not sufficiently converge, the initial oil pressure may be excessively high in relation to the exact oil pressure for ending the piston stroke. In such cases, although an absolute value of variation in the output shaft torque is small during the torque phase, output shaft torque variation in relation to the output shaft torque following the fuel cut recovery is large, and therefore a driver is likely to experience shift shock.

By setting the initial oil pressure low, the shift shock experienced by the driver can be suppressed. However, during a fuel cut, for example, reverse driving force is greater than the reverse driving force following a fuel cut recovery, and therefore, although the shift shock experienced by the driver can be suppressed when the initial oil pressure increases, the oil pressure rises from an excessively low initial oil pressure, and as a result, a large amount of time is required to reach a predetermined oil pressure. Hence, during a coasting downshift performed during a fuel cut, the start of the inertia phase is delayed. During the delay, an engine rotation speed Ne decreases such that a fuel cut recovery is executed, and as a result, shock and a reduction in fuel efficiency occur upon execution of the fuel cut recovery.

This invention has been designed to solve such problems, and it is an object thereof to suppress shock generation during a shift and prevent a reduction in fuel efficiency when a downshift is performed in a coasting state.

According to an aspect of the present invention, a control device for a vehicle having an automatic transmission which includes a plurality of friction elements, switches between a plurality of gear positions by using an oil pressure to set a part of the friction elements in an engaged state and the remainder of the friction elements in a disengaged state, shifts a rotation speed of an input shaft, and outputs the shifted rotation speed from an output shaft is provided. The control device for the vehicle comprises a downshift determining unit that determines whether to perform a downshift, a fuel cut determining unit that determines whether the downshift is to be performed in a fuel cut state or a post-fuel cut recovery state when the downshift is performed in a coasting state, and an oil pressure control unit that performs a piston stroke in an engagement side friction element when the downshift is performed in the coasting state by increasing a command oil pressure of the engagement side friction element to a first oil pressure and then setting the command oil pressure at a second oil pressure that is lower than the first oil pressure. The oil pressure control unit controls the second oil pressure to be lower in the post-fuel cut recovery state than in the fuel cut state.

According to another aspect of the present invention, a control method for a vehicle having an automatic transmission which includes a plurality of friction elements, switches between a plurality of gear positions by using an oil pressure to set a part of the friction elements in an engaged state and the remainder of the friction elements in a disengaged state, shifts a rotation speed of an input shaft, and outputs the shifted rotation speed from an output shaft. The method comprises determining whether to perform a downshift, determining whether the downshift is to be performed in a fuel cut state or a post-fuel cut recovery state when the downshift is performed in a coasting state, and performing a piston stroke in an engagement side friction element when the downshift is performed in the coasting state by increasing a command oil pressure of the engagement side friction element to a first oil pressure and then setting the command oil pressure at a second oil pressure that is lower than the first oil pressure. The second oil pressure in the post-fuel cut recovery is controlled by lower pressure than the second oil pressure in the fuel cut state.

According to these inventions, when a downshift is performed while a vehicle travels in the coasting state, the second oil pressure in the post-fuel cut recovery state is controlled to a lower oil pressure than the second oil pressure in the fuel cut state, and therefore, during a post-fuel cut recovery downshift, in which output shaft torque variation relative to an output shaft torque is large, a piston stroke can be performed from a low oil pressure even when variation occurs in the actual oil pressure or learning control does not converge, whereby shift shock experienced by a driver can be suppressed. Further, in the case of a downshift performed during a fuel cut, in which output shaft torque variation relative to the output shaft torque is small, the oil pressure is higher than the oil pressure of the post-fuel cut recovery state, and therefore the piston stroke is accelerated to a greater degree than in the post-fuel cut recovery state. As a result, a situation in which an engine rotation speed decreases such that a fuel cut recovery is executed during the shift, for example, can be prevented. Hence, shock and a reduction in fuel efficiency occurring when a fuel cut recovery is executed during the shift can be suppressed.

The details as well as other features and advantages of these aspects are set forth in the remainder of the specification and are shown in the accompanying drawings.

DESCRIPTION OF THE PREFERRED EMBODIMENTS

Figure 1:
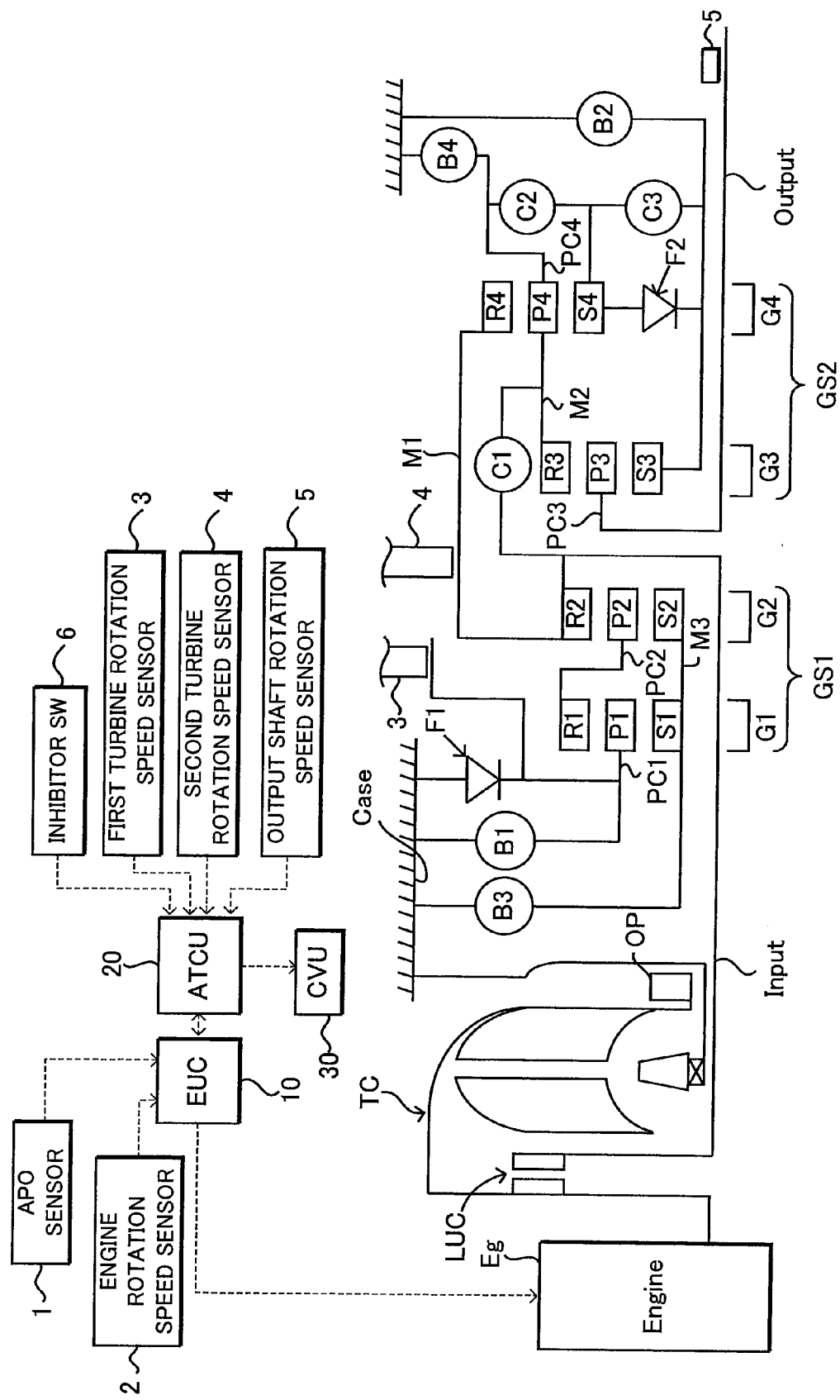
FIG. 1 is a skeleton diagram of an automatic transmission according to an embodiment of this invention.

The constitution of an embodiment of this invention will now be described using FIG. 1. FIG. 1 is a skeleton diagram showing an example of an automatic transmission to which a control device according to this embodiment is applied.

The automatic transmission according to this embodiment is a seven-forward speed, one-reverse speed stages automatic transmission. In the automatic transmission, a driving force of an engine Eg is input from an input shaft Input via a torque converter TC, subjected to rotation speed shifting by four planetary gears and seven frictional engagement elements (friction elements), and then output from an output shaft Output. Further, an oil pump OP is provided coaxially with a pump impeller of the torque converter TC so as to pressurize oil when driven to rotate by the driving force of the engine Eg.

The torque converter TC includes a lockup clutch LUC for eliminating a rotation difference between the pump impeller and a turbine runner.

Further, an engine controller 10 (ECU) that controls a driving condition of the engine Eg, an automatic transmission controller 20 (ATCU) that controls a shift condition and so on of the stepped transmission, and a control valve unit 30 (CVU) that controls the oil pressure of each frictional engagement element on the basis of an output signal from the automatic transmission controller 20 are provided. The engine controller 10 and the automatic transmission controller 20 are connected via a CAN communication line or the like so as to share sensor information and control information with each other through communication.

An accelerator opening sensor (APO sensor) 1 that detects an accelerator pedal operation amount of a driver and an engine rotation speed sensor 2 that detects an engine rotation speed Ne are connected to the engine controller 10. The engine controller 10 controls a fuel injection amount and a throttle opening on the basis of the engine rotation speed Ne and the accelerator pedal operation amount, thereby controlling an engine output rotation speed and an engine torque.

A first turbine rotation speed sensor 3 that detects a rotation speed of a first carrier PC1, a second turbine rotation speed sensor 4 that detects a rotation speed of a first ring gear R1, an output shaft rotation speed sensor 5 that detects a rotation speed of the output shaft Output, and an inhibitor switch 6 that detects a range position selected by a shift lever operation performed by the driver are connected to the automatic transmission controller 20. When a D range is selected, an optimum command gear position based on a vehicle speed VSP and an accelerator opening APO indicating the accelerator pedal operation amount is selected, and a control command for achieving the command gear position is output to the control valve unit 30.

Next, a shift gear mechanism provided between the input shaft Input and the output shaft Output will be described.

A first planetary gear set GS1 constituted by a first planetary gear G1 and a second planetary gear G2, and a second planetary gear set GS2 constituted by a third planetary gear G3 and a fourth planetary gear G4 are disposed coaxially in sequence from the input shaft Input side to the output shaft Output side. Further, a first clutch C1, a second clutch C2, a third clutch C3, a first brake B1, a second brake B2, a third brake B3, and a fourth brake B4 are disposed as the frictional engagement elements. A first one-way clutch F1 and a second one-way clutch F2 are also disposed.

The first planetary gear G1 is a single pinion planetary gear including a first sun gear S1, the first ring gear R1, and the first carrier PC1 supporting a first pinion P1 that meshes with the two gears S1, R1.

The second planetary gear G2 is a single pinion planetary gear including a second sun gear S2, a second ring gear R2, and a second carrier PC2 supporting a second pinion P2 that meshes with the two gears S2, R2.

The third planetary gear G3 is a single pinion planetary gear including a third sun gear S3, a third ring gear R3, and a third carrier PC3 supporting a third pinion P3 that meshes with the two gears S3, R3.

The fourth planetary gear G4 is a single pinion planetary gear including a fourth sun gear S4, a fourth ring gear R4, and a fourth carrier PC4 supporting a fourth pinion P4 that meshes with the two gears S4, R4.

The input shaft Input is connected to the second ring gear R2 so as to input a rotary driving force from the engine Eg via the torque converter TC and so on. The output shaft Output is connected to the third carrier PC3 so as to transmit an output rotary driving force to a drive wheel via a final gear or the like.

The first ring gear R1, second carrier PC2, and fourth ring gear R4 are connected integrally by a first connecting member M1. The third ring gear R3 and fourth carrier PC4 are connected integrally by a second connecting member M2. The first sun gear S1 and second sun gear S2 are connected integrally by a third connecting member M3.

By connecting the first planetary gear G1 and second planetary gear G2 using the first connecting member M1 and third connecting member M3, the first planetary gear set GS1 is formed from four rotary elements. By connecting the third planetary gear G3 and fourth planetary gear G4 using the second connecting member M2, the second planetary gear set GS2 is formed from five rotary elements.

In the first planetary gear set GS1, torque is input into the second ring gear R2 from the input shaft Input, whereupon the input torque is output to the second planetary gear set GS2 via the first connecting member M1. In the second planetary gear set GS2, torque is input into the second connecting member M2 directly from the input shaft Input and input into the fourth ring gear R4 via the first connecting member M1, whereupon the input torque is output to the output shaft Output from the third carrier PC3.

The first clutch C1 (input clutch I/C) selectively connects and disconnects the input shaft Input and the second connecting member M2. The second clutch C2 (direct clutch D/C) selectively connects and disconnects the fourth sun gear S4 and the fourth carrier PC4. The third clutch C3 (H&LR clutch H&m/C) selectively connects and disconnects the third sun gear S3 and the fourth sun gear S4.

Further, the second one-way clutch F2 is disposed between the third sun gear S3 and fourth sun gear S4. Hence, when the third clutch C3 is disengaged and the rotation speed of the fourth sun gear S4 is greater than that of the third sun gear S3, the third sun gear S3 and fourth sun gear S4 generate independent rotation speeds. As a result, the third planetary gear G3 and fourth planetary gear G4 are connected via the second connecting member M2 such that the respective planetary gears achieve independent gear ratios.

The first brake B1 (front brake Fr/B) selectively stops rotation of the first carrier PC1 relative to a transmission case Case. Further, the first one-way clutch F1 is disposed parallel to the first brake B1. The second brake B2 (low brake LOW/B) selectively stops rotation of the third sun gear S3 relative to the transmission case Case. The third brake B3 (2346 brake 2346/B) selectively stops rotation of the third connecting member M3 connecting the first sun gear S1 and the second sun gear S2 relative to the transmission case Case. The fourth brake B4 (reverse brake R/B) selectively stops rotation of the fourth carrier PC4* relative to the transmission case Case.

Figures 2, 3:
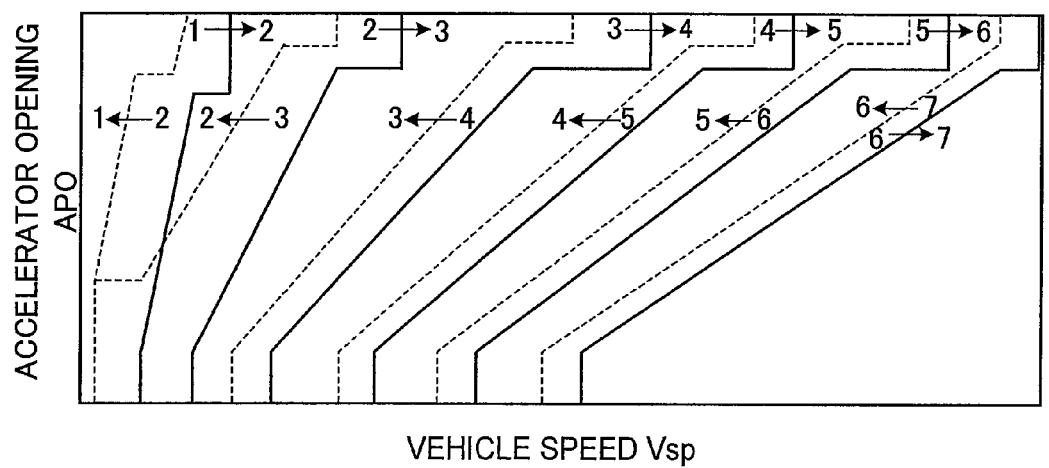
FIG. 2 is an engagement operation table of frictional engagement elements according to an embodiment of this invention.
FIG. 3 is a shift map according to an embodiment of this invention.

FIG. 2 is an engagement operation table showing engagement states of the respective frictional engagement elements in each gear position of the automatic transmission to which the control device according to this embodiment is applied. In FIG. 2, circles indicate that the corresponding frictional engagement element is engaged. Circles enclosed in parentheses indicate that the corresponding frictional engagement element is engaged when a range position in which an engine brake is activated has been selected. Blank spaces indicate that the corresponding frictional engagement element is disengaged.

By performing a replacement shift, in which an engaged frictional engagement element is disengaged and a disengaged frictional engagement element is engaged, during an upshift or a downshift between adjacent gear positions, seven forward speeds and one reverse speed can be realized with respect to the engagement states of the respective frictional engagement elements provided in the shift gear mechanism constituted as described above in the manner described below.

In a "first speed", only the second brake B2 is engaged such that the first one-way clutch F1 and the second one-way clutch F2 are engaged. In a "second speed", the second brake B2 and the third brake B3 are engaged and the second one-way clutch F2 is engaged. In a "third speed", the second brake B2, third brake B3, and second clutch C2 are engaged, and neither the first one-way clutch F1 nor the second one-way clutch F2 is engaged. In a "fourth speed", the third brake B3, second clutch C2, and third clutch C3 are engaged. In a "fifth speed", the first clutch C1, second clutch C2, and third clutch C3 are engaged. In a "sixth speed", the third brake B3, first clutch C1, and third clutch C3 are engaged. In a "seventh speed", the first brake B1, first clutch C1, and third clutch C3 are engaged, and the first one-way clutch F1 is engaged. In a "reverse speed", the fourth brake B4, first brake B1, and third clutch C3 are engaged.

FIG. 3 is a shift diagram showing an example of a shift map used during shift control performed by the automatic transmission according to this embodiment when a D range is selected. In FIG. 3, solid lines indicate upshift lines and dotted lines indicate downshift lines.

When the D range is selected, a position of an operating point determined on the basis of the vehicle speed VSP from the output shaft rotation speed sensor 5 (vehicle speed sensor) and the accelerator opening APO from the accelerator opening sensor 1 on the shift map is searched for. When the operating point has not moved or when the operating point has moved but remains within a single shift region on the shift map shown in FIG. 3, the gear position at that time is maintained.

When the operating point crosses an upshift line on the shift map shown in FIG. 3, on the other hand, an upshift command to perform an upshift from the gear position indicated by the region of the operating point before crossing the upshift line to a gear position indicated by the region in which the operating point exists after crossing the upshift line is output. Further, when the operating point crosses a downshift line on the shift map shown in FIG. 3, a downshift command to perform a downshift from the gear position indicated by the region of the operating point before crossing the downshift line to a gear position indicated by the region in which the operating point exists after crossing the downshift line is output.

Figure 4:
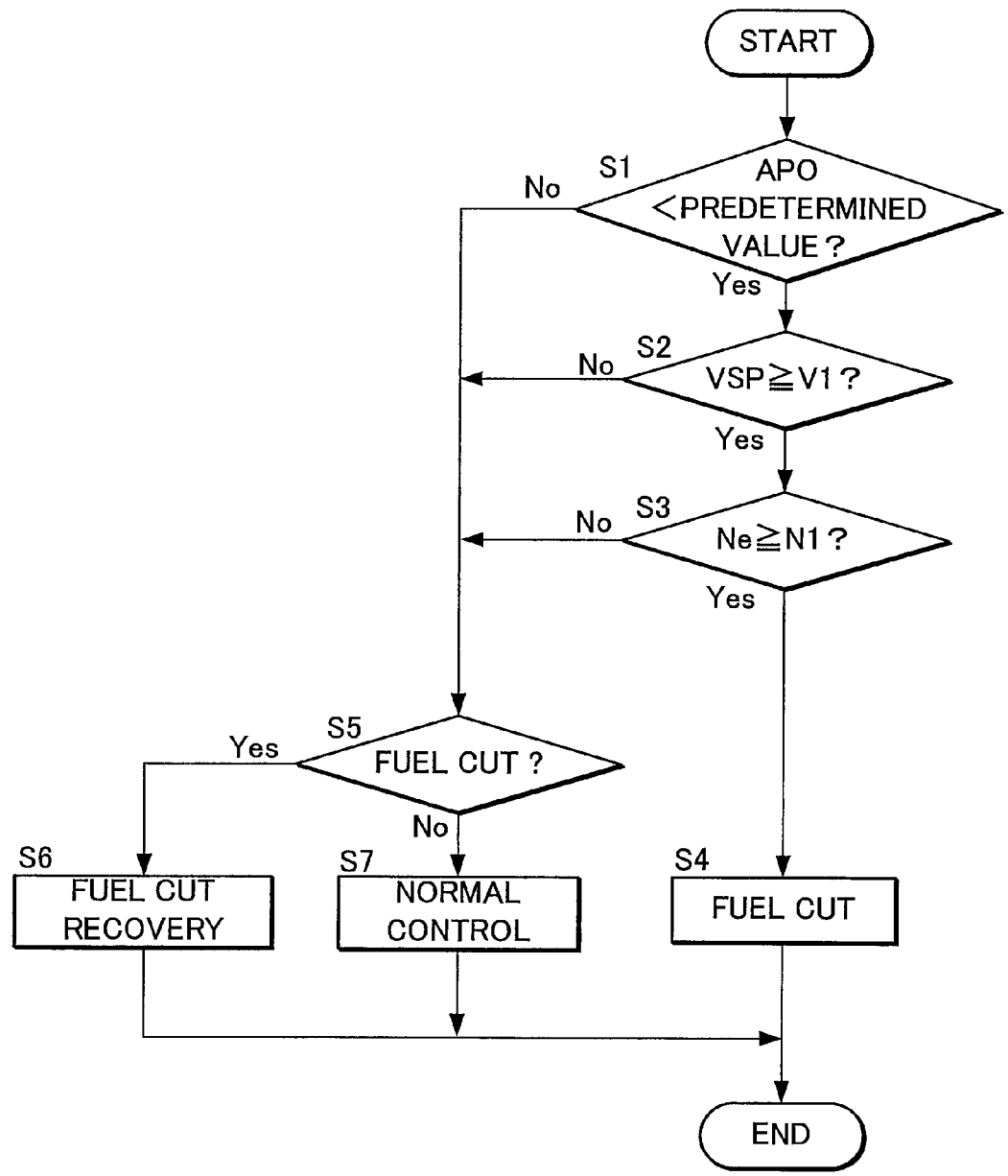
FIG. 4 is a flowchart illustrating fuel cut determination control according to an embodiment of this invention.

When the vehicle satisfies a predetermined condition, the engine Eg performs fuel cut control to improve the fuel efficiency. Control for determining whether or not to perform a fuel cut will now be described using a flowchart shown in FIG. 4.

In a step S1, a determination is made as to whether or not the accelerator opening sensor 1 is at or above a predetermined value. When the accelerator opening sensor 1 is below the predetermined value, the routine advances to a step S2, and when the accelerator opening sensor 1 is at or above the predetermined value, the routine advances to a step S5. This determination may be performed on the basis of whether or not an idle switch, not shown in the drawings, is ON.

In the step S2, the vehicle speed VSP is calculated by the output shaft rotation speed sensor 5. The vehicle speed VSP is then compared to a predetermined vehicle speed V1, and when the vehicle speed VSP is equal to or higher than the predetermined vehicle speed V1, the routine advances to a step S3. When the vehicle speed VSP is lower than the predetermined vehicle speed V1, on the other hand, the routine advances to the step S5. The predetermined vehicle speed V1 is a preset vehicle speed of 20 km/h, for example.

In the step S3, the engine rotation speed Ne is calculated by the engine rotation speed sensor 2. The engine rotation speed Ne is then compared to a predetermined rotation speed N1, and when the engine rotation speed Ne is equal to or higher than the predetermined rotation speed N1, the routine advances to a step S4. When the engine rotation speed Ne is lower than the predetermined rotation speed N1, the routine advances to the step S5. The predetermined rotation speed N1 is a rotation speed at which the engine Eg does not stall.

When the accelerator opening sensor 1 is below the predetermined value, the vehicle speed VSP is equal to or higher than the predetermined vehicle speed V1, and the engine rotation speed Ne is equal to or higher than the predetermined rotation speed N1, a fuel cut is performed in the step S4. As a result, the fuel efficiency can be improved.

In the step S5, a determination is made as to whether or not a fuel cut is currently underway. When a fuel cut is underway, the routine advances to a step S6. When a fuel cut is not underway, the routine advances to a step S7.

In the step S6, a fuel cut recovery is performed by resuming fuel injection into the engine Eg.

In the step S7, normal fuel injection control is performed.

Figure 5:
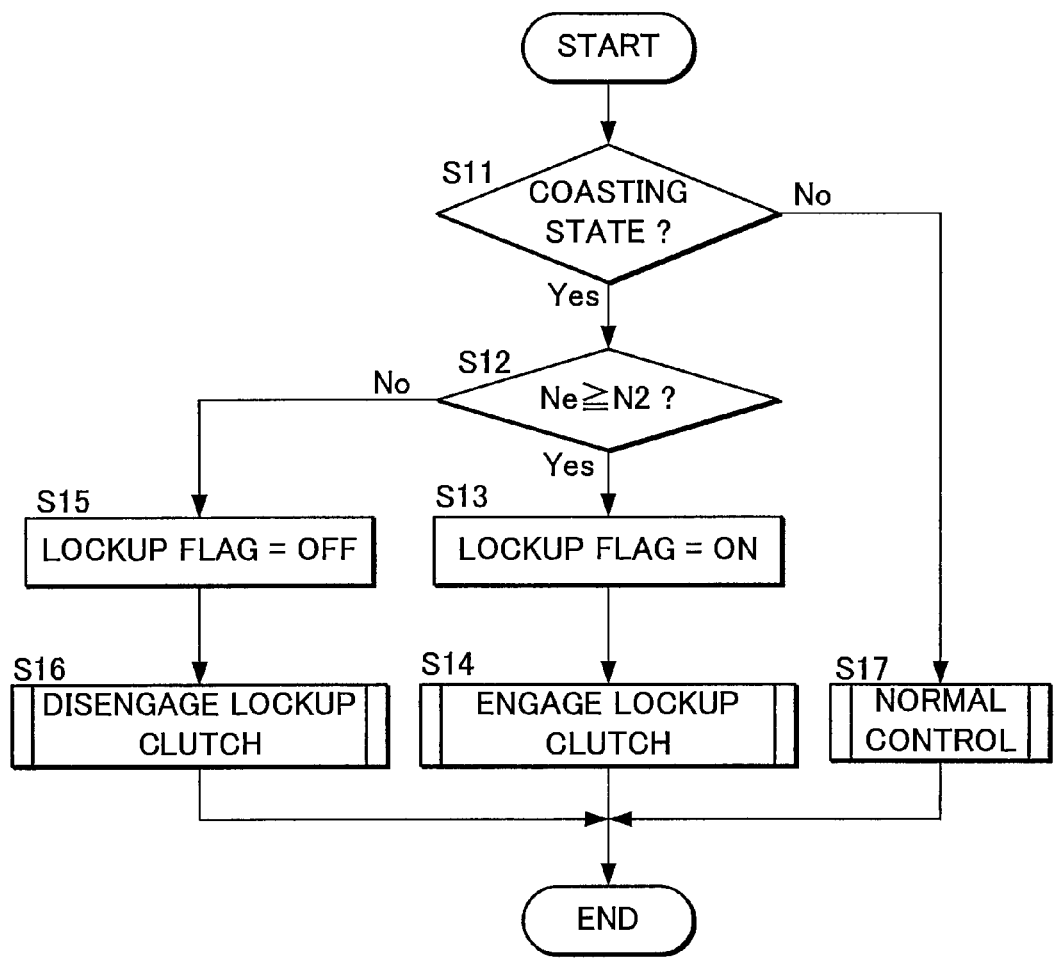
FIG. 5 is a flowchart illustrating lockup clutch engagement control according to an embodiment of this invention.

Next, engagement control performed on the lockup clutch LUC in a coasting state according to this embodiment will be described using a flowchart shown in FIG. 5.

In a step S11, a determination is made as to whether or not a traveling state of the vehicle corresponds to a coasting state. The coasting state may be determined similarly to the step S1 of FIG. 4 or on the basis of a ratio between the engine rotation speed and the rotation speed of the input shaft Input. When a coasting state is established, the routine advances to a step S12, and when a coasting state is not established, the routine advances to a step S17.

In the step S12, a determination is made as to whether or not a coasting lockup condition is established. When the coasting lockup condition is established, the routine advances to a step S13, and when the coasting lockup condition is not established, the routine advances to a step S15. The coasting lockup condition is established when the engine rotation speed Ne is equal to or higher than a second rotation speed N2 in the coasting state. The second rotation speed N2 is a preset speed taking a greater value than the first rotation speed N1.

In the step S13, a lockup flag is switched ON, whereupon the routine advances to a step S14. Since the coasting state is established and the engine rotation speed Ne is equal to or higher than the second rotation speed N2, the lockup clutch LUC is engaged, thereby establishing a slip state or a complete lockup state.

In the step S15, the lockup flag is switched OFF, whereupon the routine advances to a step S16. Since the coasting state is established and the engine rotation speed Ne is lower than the second rotation speed N2, the lockup clutch LUC is disengaged.

In the step S17, engagement/disengagement control of the lockup clutch LUC in a non-coasting state is performed. Here, for example, the lockup clutch LUC is engaged and disengaged on the basis of a map or the like set in advance from the vehicle speed VSP and the accelerator opening APO.

Figure 6:
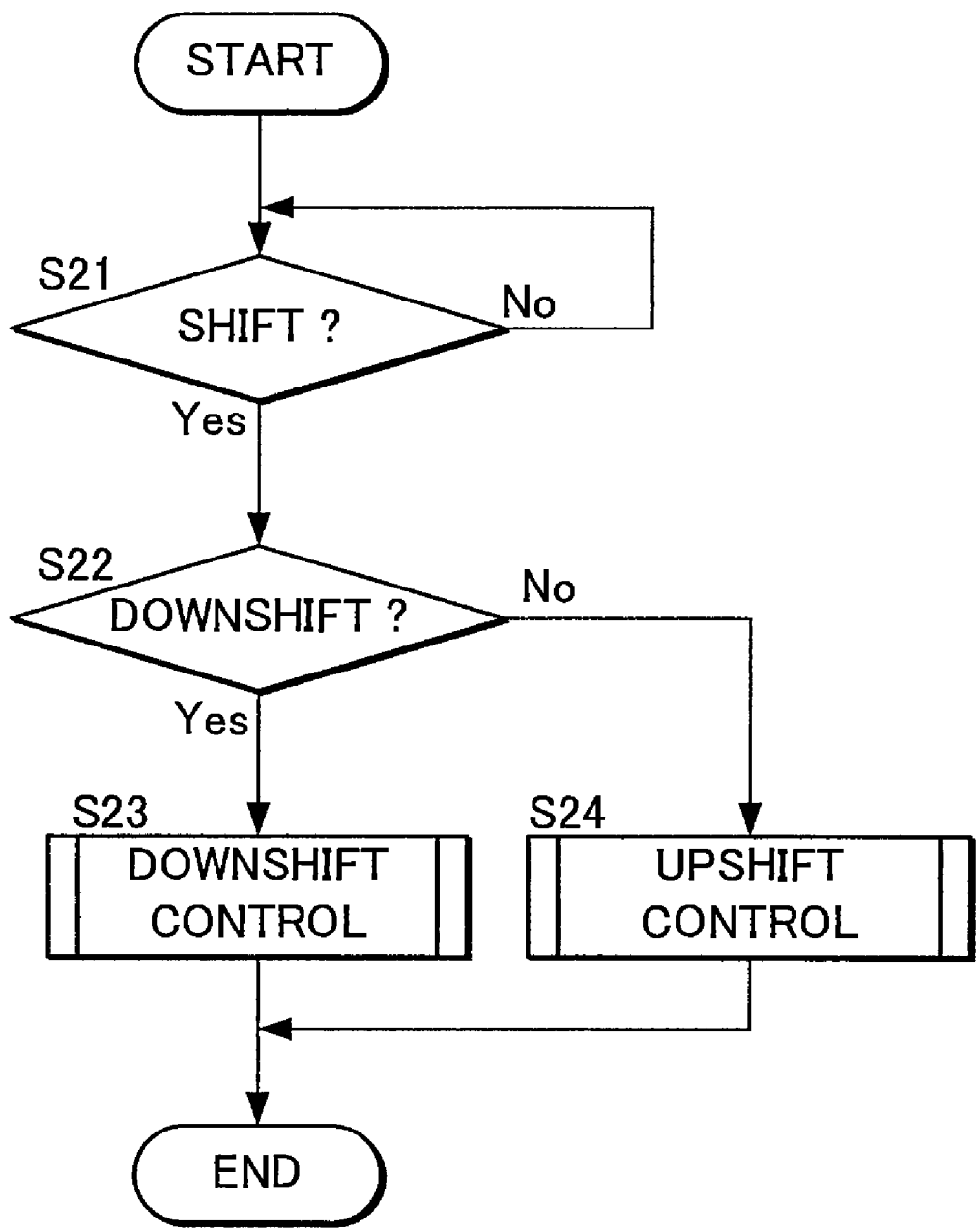
FIG. 6 is a flowchart illustrating gear position switching control according to an embodiment of this invention.

Next, gear position switching control according to this embodiment will be described using a flowchart shown in FIG. 6.

In a step S21, a determination is made as to whether or not a shift determination has been made. When a shift determination has been made, the routine advances to a step S22, and when a shift determination has not been made, the determination of this step is repeated.

In the step S22, a determination is made as to whether or not the shift determination indicates a downshift. When the shift determination indicates a downshift, the routine advances to a step S23, and when the shift determination indicates an upshift, the routine advances to a step S24.

In the step S23, a shift is realized on the basis of the downshift determination by engaging an engagement side frictional engagement element and disengaging a disengagement side frictional engagement element. Frictional engagement element control during a downshift will be described below.

In the step S24, a shift is realized on the basis of the upshift determination by engaging the engagement side frictional engagement element and disengaging the disengagement side frictional engagement element. During an upshift, the upshift is executed on the basis of set control.

Figure 7:
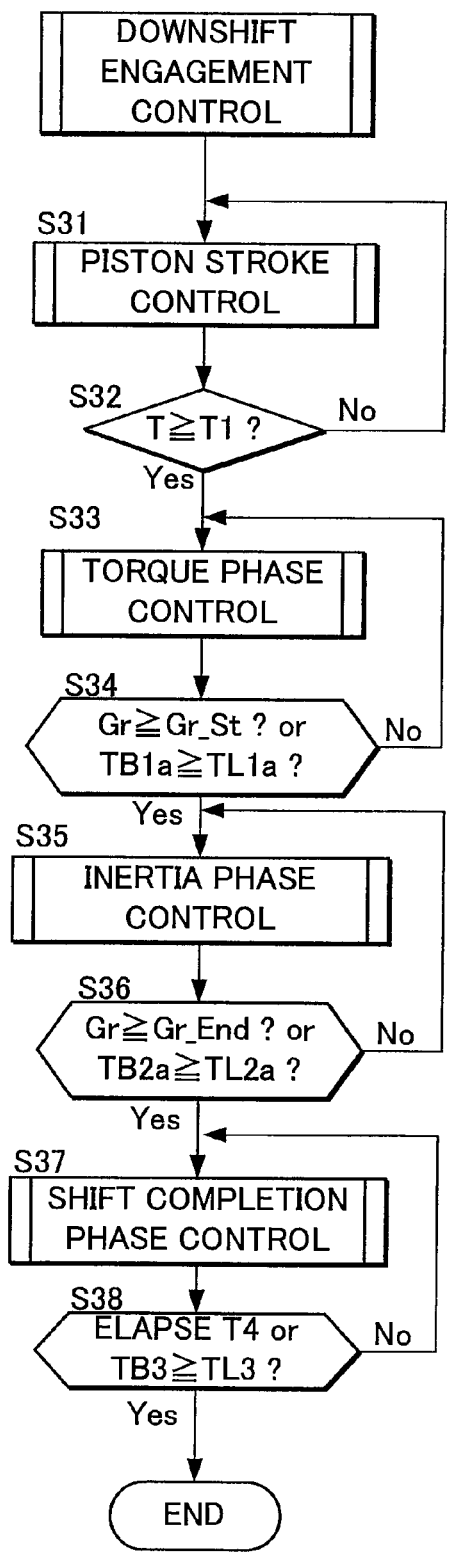
FIG. 7 is a flowchart illustrating engagement side frictional engagement element control during a downshift.

Next, engagement control of the engagement side frictional engagement element during a downshift, which is performed in the step S23 of FIG. 6, will be described using a flowchart shown in FIG. 7.

In a step S31, piston stroke control is performed by raising a command oil pressure of the engagement side frictional engagement element to a pre-charge oil pressure (first oil pressure) and then lowering the oil pressure of the engagement side frictional engagement element to an initial oil pressure (second oil pressure). Thus, a piston of the engagement side frictional engagement element is caused to stroke. This control will be described in detail below. The pre-charge oil pressure is a command oil pressure temporarily set high to cause the stroke of the piston to end quickly. The initial oil pressure is an oil pressure for completing the piston stroke, and also serves as an initial oil pressure when the oil pressure of the engagement side frictional engagement element is raised during torque phase control, to be described in detail below.

In a step S32, a determination is made as to whether or not a time T from an engagement command has reached or exceeded a first time T1. When the time T has reached or exceeded the first time T1, it is determined that the piston stroke of the engagement side frictional engagement element is complete, and the routine advances to a step S33. When the time T has not reached the first time T1, it is determined that the piston stroke of the engagement side frictional engagement element is not complete, and the routine returns to the step S31. The first time T1 is long enough to complete the piston stroke of the engagement side frictional engagement element during a downshift. When an offset oil pressure, to be described in detail below, is set, the first time T1 takes a larger value than when the offset oil pressure is not set.

When the offset oil pressure is set, the initial oil pressure decreases, but by setting the first time T1 when the offset oil pressure is set to take a larger value than the first time T1 when the offset oil pressure is not set, the piston stroke can be completed reliably.

When it is determined in the step S32 that the time T1 has reached or exceeded the first time T1, torque phase control for increasing the oil pressure of the engagement side frictional engagement element from the initial oil pressure on a predetermined increase gradient is performed in the step S33. In the torque phase control, a torque of the output shaft Output varies but the input rotation speed input into the automatic transmission does not vary.

The increase gradient following a fuel cut recovery is smaller than the increase gradient during a fuel cut. The increase gradient during a fuel cut is set larger than the increase gradient following a fuel cut recovery to prevent a situation in which a fuel cut recovery is performed due to a reduction in the engine rotation speed Ne during the torque phase when a fuel cut is underway. As a result, shock occurring during a fuel cut recovery can be prevented and a reduction in fuel efficiency can be suppressed. Further, the increase gradient following a fuel cut recovery is set to be small so that even when the command oil pressure varies or learning control does not converge, shift shock experienced by the driver during the torque phase is reduced.

In a step S34, a determination is made as to whether or not a first gear ratio condition according to which an actual gear ratio Gr (current gear ratio) is equal to or greater than an inertia phase start determination gear ratio Gr_St is established. When the actual gear ratio Gr is equal to or greater than the inertia phase start determination gear ratio Gr_St, the routine advances to a step S35, and when the actual gear ratio Gr is not equal to or greater than the inertia phase start determination gear ratio Gr_St, the routine returns to the step S33.

It should be noted that if a first time condition according to which a first backup timer TB1$a$ that starts counting at the start of the torque phase control has reached a second time TL1$a$ is established even though the actual gear ratio Gr is not equal to or greater than the inertia phase start determination gear ratio Gr_St, the oil pressure of the engagement side frictional engagement element is raised to a torque phase control completion lower limit pressure, whereupon the routine advances to the step S35. The second time TL1a is a predetermined time required for the actual gear ratio Gr to reach or exceed the inertia phase start determination gear ratio Gr_St from the start of the torque phase control. If the actual gear ratio Gr is not equal to or greater than the inertia phase start determination gear ratio Gr_St even when the first backup timer TB1a has reached the second time TL1a, the oil pressure of the engagement side frictional engagement element is set at the torque phase control completion lower limit pressure. As a result, the torque phase is terminated and the shift is forcibly advanced to an inertia phase.

When it is determined in the step S34 that one of the first gear ratio condition and the first time condition is established, inertia phase control is performed in the step S35. The inertia phase occurs during a shift, and in the inertia phase, the transmission input rotation speed varies mainly due to variation in an inertial force of a driving system. In the inertia phase control, the oil pressure of the engagement side frictional engagement element is raised gradually. The increase gradient following a fuel cut recovery is smaller than the increase gradient during a fuel cut.

In a step S36, a determination is made as to whether or not a second gear ratio condition according to which the actual gear ratio Gr is equal to or greater than an inertia phase end determination gear ratio Gr_End is established. When the actual gear ratio Gr is equal to or greater than the inertia phase end determination gear ratio Gr_End, the routine advances to a step S37, and when the actual gear ratio Gr is not equal to or greater than the inertia phase end determination gear ratio Gr_End, the routine returns to the step S35.

It should be noted that if a second time condition according to which a second backup timer TB2a that starts counting at the start of the inertia phase control has reached a third time TL2a is established even though the actual gear ratio Gr is not equal to or greater than the inertia phase end determination gear ratio Gr_End, the oil pressure of the engagement side frictional engagement element is raised to an inertia phase control completion lower limit pressure, whereupon the routine advances to the step S37. The third time TL2a is a preset time required for the actual gear ratio Gr to reach or exceed the inertia phase end determination gear ratio Gr_End from the start of the inertia phase control. If the actual gear ratio Gr is not equal to or greater than the inertia phase end determination gear ratio Gr_End even when the second backup timer TB2a has reached the third time TL2a, the oil pressure of the engagement side frictional engagement element is set at the inertia phase control completion lower limit pressure. As a result, the inertia phase is terminated and the shift is forcibly advanced to a shift completion phase.

When it is determined in the step S36 that one of the second gear ratio condition and the second time condition is established, shift completion phase control is performed in the step S37. In the shift completion phase control, the oil pressure of the engagement side frictional engagement element is raised to a maximum value by causing the actual gear ratio Gr to reach a post-shift gear position gear ratio Grn.

In a step S38, a determination is made as to whether or not a third gear ratio condition where a fourth time T4 has elapsed after the actual gear ratio Gr reaches the post-shift gear position gear ratio Grn is established. When the fourth time T4 has elapsed after the gear position gear ratio Grn is reached, the control is terminated. When the fourth time T4 has not elapsed after the gear position gear ratio Grn is reached, the routine returns to the step S37. The fourth time T4 is a preset time required for the oil pressure of the engagement side frictional engagement element to reach a maximum oil pressure reliably after the actual gear ratio Gr reaches the post-shift gear position gear ratio Grn.

It should be noted that if a third time condition according to which a third backup timer TB3 that starts counting from the start of the shift completion phase control reaches a fifth time TL3 even though the third gear ratio condition is not established, or in other words even though the actual gear ratio Gr has not reached the post-shift gear position gear ratio Grn, the oil pressure of the engagement side frictional engagement element is set at the maximum oil pressure. The fifth time TL3 is a preset time required for the actual gear ratio Gr to reach the post-shift gear position gear ratio Grn and the oil pressure of the engagement side frictional engagement element to reach the maximum oil pressure following the start of the shift completion phase control. When the actual gear ratio Gr has not reached the gear position gear ratio Grn, the shift can be completed by setting the oil pressure of the engagement side frictional engagement element at the maximum pressure.

Figure 8:
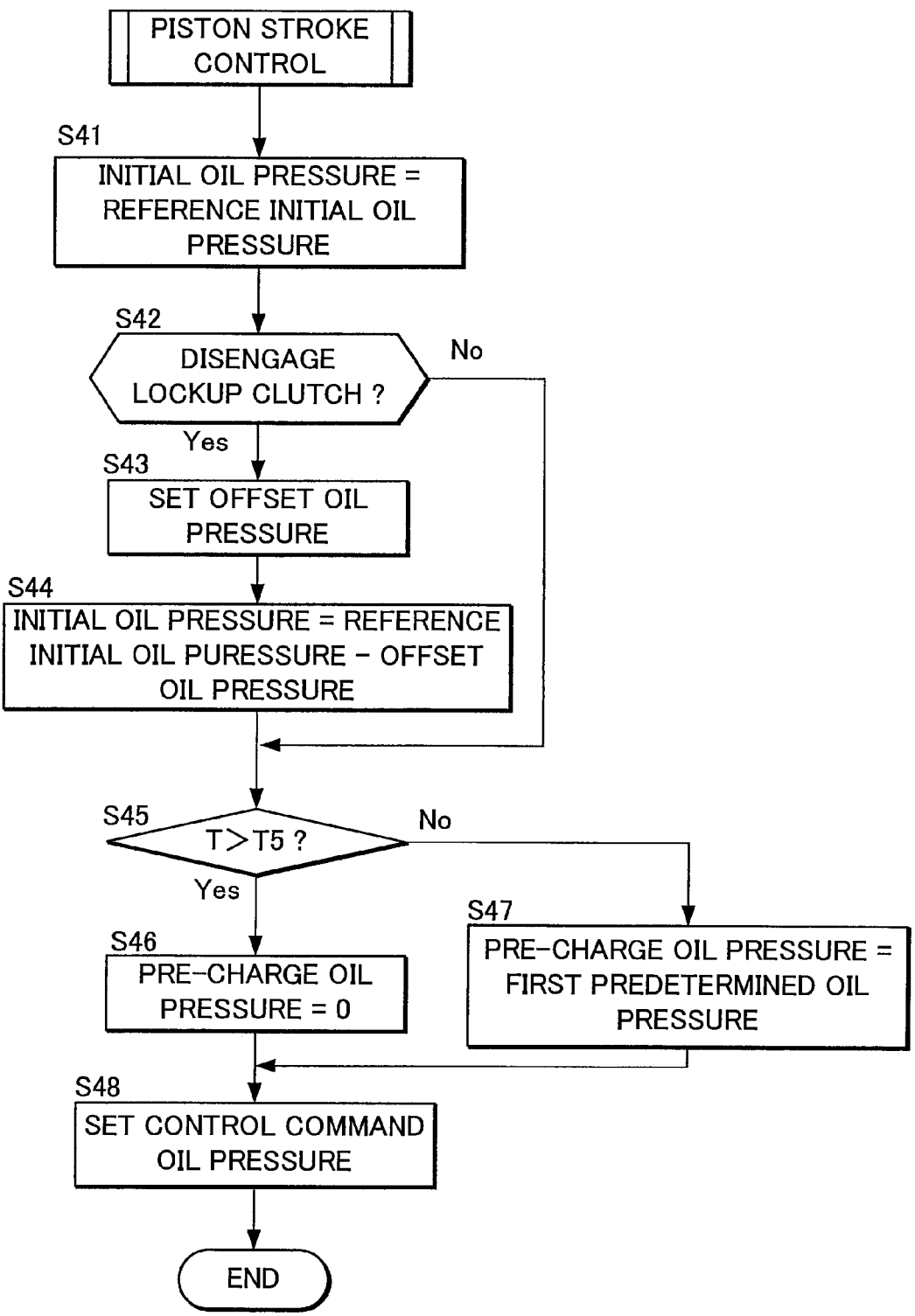
FIG. 8 is a flowchart illustrating piston stroke control.

Next, piston stroke control performed in the step S31 of FIG. 7 will be described using a flowchart shown in FIG. 8.

In a step S41, a reference initial oil pressure is set as the initial oil pressure, whereupon the routine advances to a step S42. The reference initial oil pressure is a preset oil pressure, but in a case where a learned correction value is calculated for each frictional engagement element such that during an upshift, a turbine rotation variation rate at the start of the inertia phase reaches a target variation rate, for example, an oil pressure reflecting the learned correction value is set as the reference initial oil pressure.

In the step S42, a determination is made as to whether or not the lockup clutch LUC is disengaged. When the lockup clutch LUC is disengaged, the routine advances to a step S43, and when the lockup clutch LUC is not disengaged, the routine advances to a step S45. Disengagement of the lockup clutch LUC is determined by determining whether the lockup flag is ON or OFF. Instead of the lockup flag, disengagement of the lockup clutch LUC may be determined by determining whether or not a command oil pressure of a control valve, not shown in the drawings, for controlling the lockup clutch LUC is equal to or greater than a predetermined value, but by making the determination using the lockup flag, i.e. a result obtained prior to oil pressure command issuance, a situation in which the responsiveness of the shift control is not completed in time for a fuel cut recovery can be prevented reliably. Further, a determination as to whether a fuel cut state or a post-fuel cut recovery state is established may be made by detecting the engine rotation speed Ne directly. In this case, control is preferably performed by determining that a fuel cut state is established when the engine rotation speed Ne is equal to or higher than the second rotation speed N2, i.e. when the lockup clutch LUC is in a slip state or a complete lockup state, and determining that a post-fuel cut recovery state is established when the engine rotation speed Ne is lower than the second rotation speed N2.

When the lockup clutch LUC is disengaged while a downshift is underway in the coasting state, the engine rotation speed Ne falls rapidly, and it is therefore possible to infer that a fuel cut recovery will be performed thereafter within a short time period. Hence, in this embodiment, when lockup is released during a fuel cut in an actual engine, it is assumed that a post-fuel cut recovery state has been entered.

Figure 9:
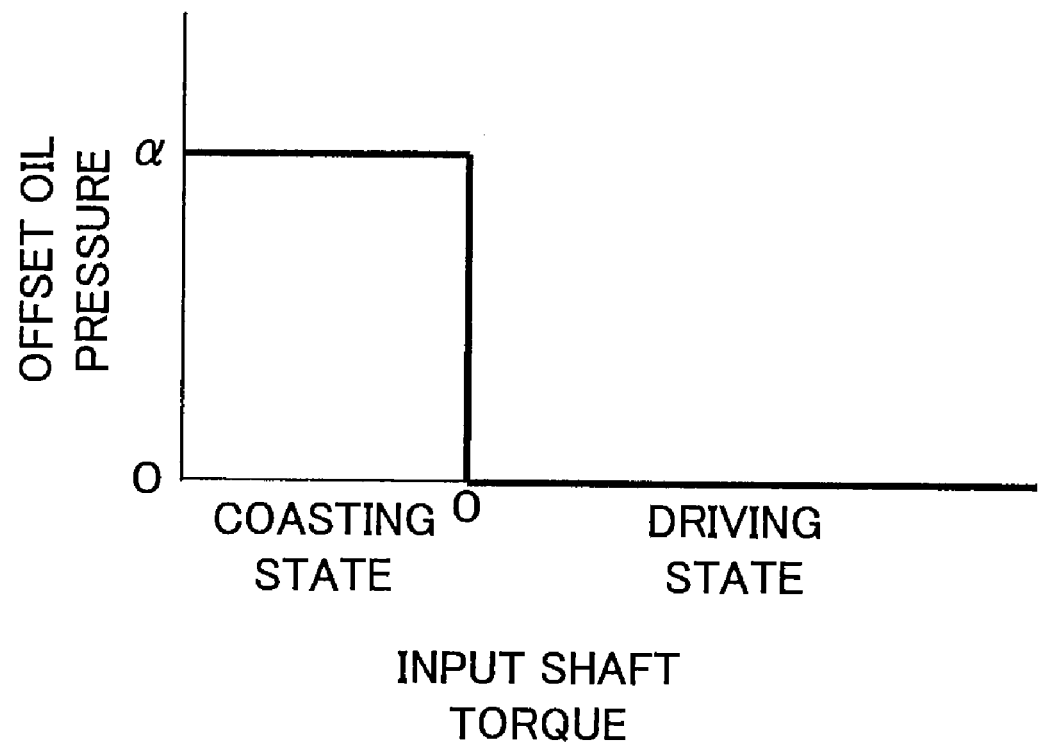
FIG. 9 is a map showing a relationship between an input shaft torque and an offset oil pressure.

In the step S42, the lockup clutch LUC is disengaged, and therefore, in the step S43, the offset oil pressure is set assuming that the engine is in a post-fuel cut recovery state. The offset oil pressure is an oil pressure that is subtracted from the reference initial oil pressure. The routine passes through this step regardless of whether the engine is in a driving state or the coasting state, but as shown in FIG. 9, the offset oil pressure is set at zero when the input shaft torque is in a positive region and at a predetermined value α in a negative torque region, and therefore data setting is performed such that the offset oil pressure is essentially set only in the coasting state. The predetermined value α is set at a value for ensuring that shift shock does not occur even when the oil pressure varies or oil pressure learning control does not converge.

In a step S44, the initial oil pressure is set by subtracting the offset oil pressure set in the step S43 from the reference initial oil pressure set in the step S41.

In the step S45, a determination is made as to whether or not the time T from shift command output is larger than a sixth time T5. When the time T is larger than the sixth time T5, it is determined that pre-charging of the oil pressure of the engagement side frictional engagement element is complete, and the routine advances to a step S46. When the time T is smaller than the sixth time T5, on the other hand, it is determined that pre-charging of the oil pressure of the engagement side frictional engagement element is not complete, and the routine advances to a step S47. The sixth time T5 is a time required to complete pre-charging of the oil pressure of the engagement side frictional engagement element, and is shorter than the first time T1.

In the step S46, the pre-charge oil pressure of the engagement side frictional engagement element is set at zero.

In the step S47, the pre-charge oil pressure of the engagement side frictional engagement element is set at a first predetermined oil pressure. The first predetermined oil pressure is a larger oil pressure than the initial oil pressure (reference initial oil pressure), which is set in order to complete the piston stroke quickly.

In a step S48, the initial oil pressure is compared to the pre-charge oil pressure, and the larger oil pressure is set as a control command (command oil pressure). Here, when the pre-charge oil pressure is set at zero in the step S46, the initial oil pressure is larger than the pre-charge oil pressure, and therefore the initial oil pressure is set as the control command oil pressure. When the pre-charge oil pressure is set as the first predetermined oil pressure in the step S47, the pre-charge oil pressure is larger than the initial oil pressure, and therefore the pre-charge oil pressure is set as the control command (command oil pressure). The oil pressure of the engagement side frictional engagement element is then controlled on the basis of the control command (command oil pressure).

Piston stroke control is performed using the control described above. In this embodiment, when a downshift is performed in the coasting state and the engine is in the post-fuel cut recovery state, the offset oil pressure is set, and in comparison with a case in which a fuel cut is underway, the initial oil pressure is set at a smaller oil pressure. At this time, the determination as to whether the fuel cut state or the post-fuel cut recovery state is established is performed on the basis of the engagement/disengagement state of the lockup clutch, and therefore, when a downshift is performed in the coasting state, a fuel cut recovery can be predicted in advance. Therefore, even if a fuel cut recovery is executed due to a reduction in the engine rotation speed Ne during piston stroke control, the engagement side friction element can be engaged at an appropriate oil pressure, thereby preventing shift shock.

Figure 10:
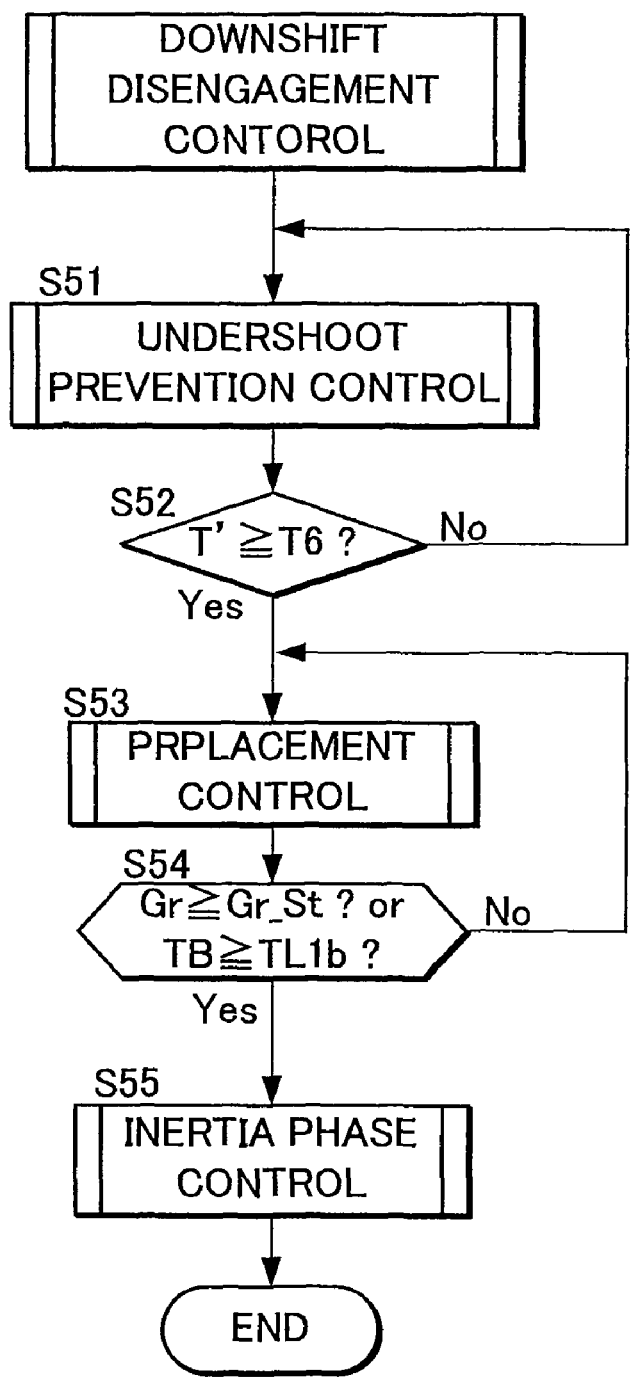
FIG. 10 is a flowchart illustrating disengagement side frictional engagement element control during a downshift.

Next, control of a frictional engagement element that is disengaged during a downshift will be described using a flowchart shown in FIG. 10.

In a step S51, undershoot prevention control is performed to reduce the oil pressure of a disengagement side frictional engagement element to a second predetermined oil pressure. In undershoot prevention control, the oil pressure of the disengagement side frictional engagement element is controlled to prevent the oil pressure of the disengagement side frictional engagement element from falling rapidly, causing the disengagement side frictional engagement element to become fully disengaged, before engagement of the engagement side frictional engagement element begins. The second predetermined oil pressure is a preset oil pressure, and the oil pressure is reduced to this oil pressure in a stepped fashion or along a predetermined decrease gradient.

In a step S52, a determination is made as to whether or not a time T' from a disengagement command is equal to or greater than a seventh time T6. When the time T' is equal to or greater than the seventh time T6, it is determined that the oil pressure of the disengagement side frictional engagement element has reached the second predetermined oil pressure, and therefore the routine advances to a step S53. When the time T' is smaller than the seventh time T6, the routine returns to the step S51. The seventh time T6 is a preset time required for the oil pressure to reach the second predetermined oil pressure reliably from the start of the undershoot prevention control. It should be noted that the seventh time T6 may be set at an identical time to the first time T1.

When it is determined in the step S52 that the time T' is equal to or greater than the seventh time T6, replacement control is performed in the step S53 to reduce the oil pressure of the disengagement side frictional engagement element from the second predetermined oil pressure gradually.

In a step S54, a determination is made as to whether or not the first gear ratio condition, according to which the actual gear ratio Gr (current gear ratio) is equal to or greater than the inertia phase start determination gear ratio Gr_St, is established. When the actual gear ratio Gr has reached the inertia phase start determination gear ratio Gr_St, the routine advances to a step S55, and when the actual gear ratio Gr has not reached the inertia phase start determination gear ratio Gr_St, the routine returns to the step S53.

It should be noted that if a fourth time condition according to which a third backup timer TB1b that starts counting at the start of the replacement control has reached an eighth time TL1b is established even though the actual gear ratio Gr has not reached the inertia phase start determination gear ratio Gr_St, the oil pressure of the disengagement side frictional engagement element is lowered to a replacement control completion upper limit pressure, whereupon the routine advances to the step S55. The eighth time TL1b is a predetermined time required for the actual gear ratio Gr to reach or exceed the inertia phase start determination gear ratio Gr_St from the start of the replacement control. If the actual gear ratio Gr is not equal to or greater than the inertia phase start determination gear ratio Gr_St even when the third backup timer TB1b has reached the eighth time TL1b, the oil pressure of the disengagement side frictional engagement element is set at the replacement control completion upper limit pressure. As a result, the replacement control is terminated and the routine advances to inertia phase control.

When it is determined in the step S54 that one of the first gear ratio condition and the fourth time condition is established, inertia phase control is performed in the step S55. In the inertia phase control, the oil pressure of the disengagement side frictional engagement element is set at a minimum pressure (a drain pressure).

In this embodiment, the oil pressure of the disengagement side frictional engagement element is set at the minimum pressure in the inertia phase control, but instead, the oil pressure of the disengagement side frictional engagement element may be reduced gradually and then set at the minimum pressure during the engagement side shift completion phase, as described with reference to FIG. 6.

Figure 11:
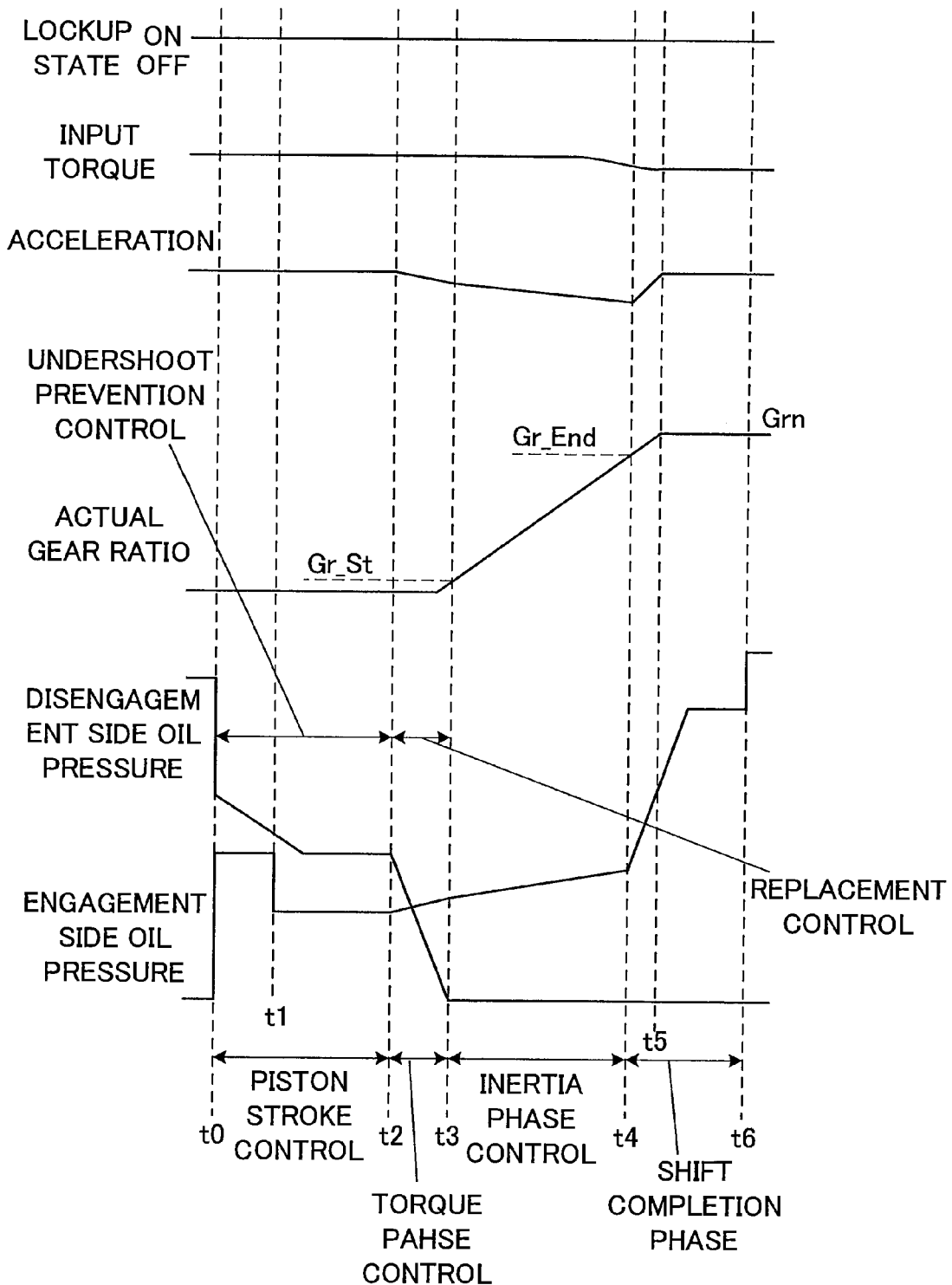
FIG. 11 is a time chart showing variation in an oil pressure of a frictional engagement element and so on when a downshift is performed during a fuel cut in an engine.
Figure 12:
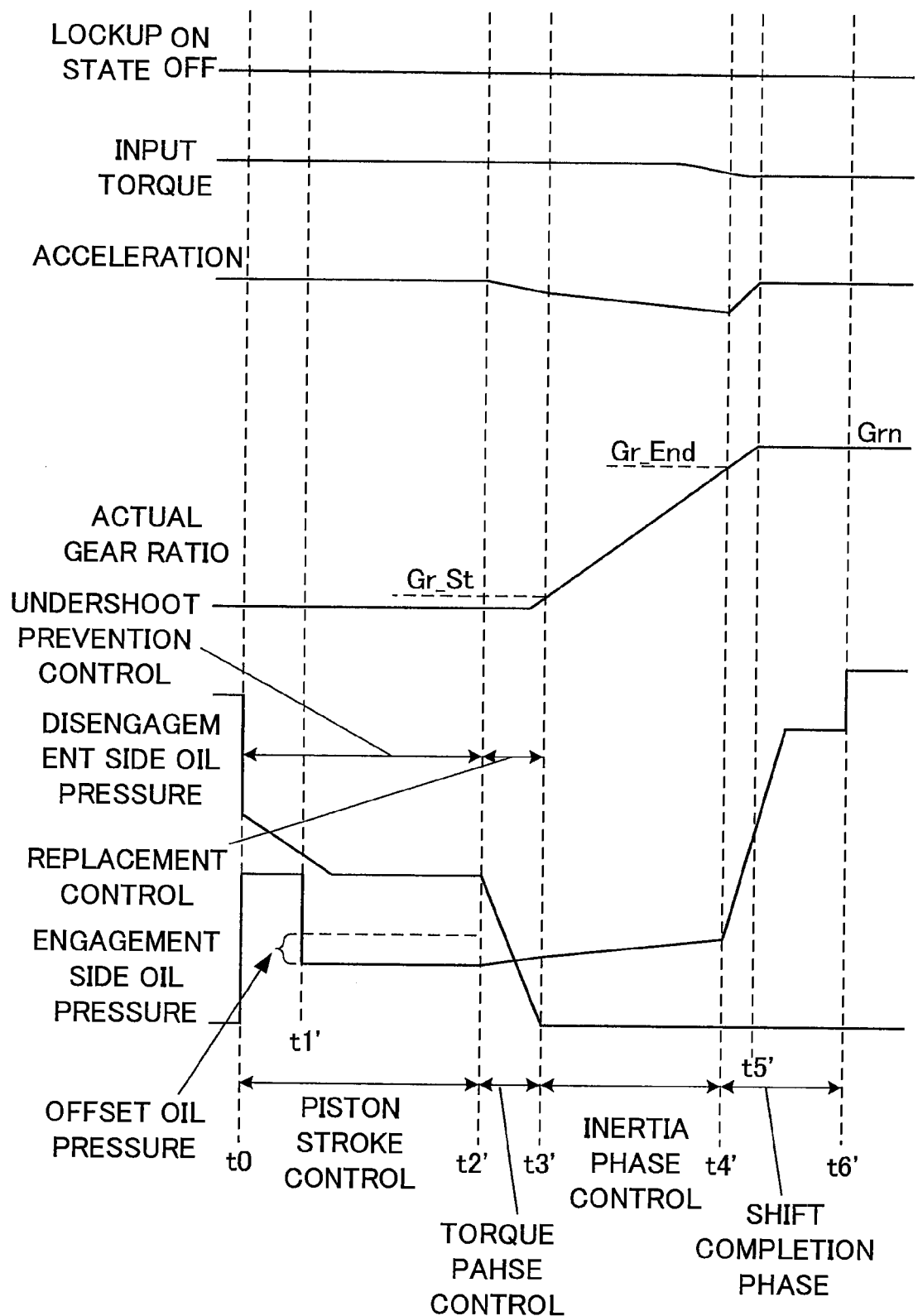
FIG. 12 is a time chart showing variation in an oil pressure of a frictional engagement element and so on when a downshift is performed following a fuel cut recovery in the engine.

Next, oil pressure variation in the frictional engagement element and so on when the control of this embodiment is employed will be described using time charts shown in FIGS. 11 and 12. FIG. 11 shows oil pressure variation in the frictional engagement element and so on when a downshift is performed during a fuel cut in the engine Eg. FIG. 12 shows oil pressure variation in the frictional engagement element and so on when a downshift is performed following a fuel cut recovery in the engine Eg.

When a coasting downshift is performed during a fuel cut, or in other words when the lockup clutch LUC is engaged, a downshift command is output in the coasting state at a time t0. As a result, piston stroke control is started in the engagement side frictional engagement element. The pre-charge oil pressure of the engagement side frictional engagement element is then set at the first predetermined oil pressure. Further, undershoot prevention control is started in the disengagement side frictional engagement element. The oil pressure of the disengagement side frictional engagement element is reduced rapidly and then reduced gradually to the second predetermined oil pressure.

When pre-charging of the engagement side frictional engagement element is completed at a time t1, the oil pressure of the engagement side frictional engagement element is set at the initial oil pressure. Here, the reference initial oil pressure is set as the initial oil pressure.

At a time t2, piston stroke control is completed and torque phase control is started in the engagement side frictional engagement element. As a result, the oil pressure of the engagement side frictional engagement element rises gradually from the initial oil pressure along a gradient set as the increase gradient during a fuel cut. Further, undershoot prevention control is completed and replacement control is started in the disengagement side frictional engagement element. As a result, the oil pressure of the disengagement side frictional engagement element is reduced further such that the disengagement side frictional engagement element is disengaged. When the disengagement side frictional engagement element is disengaged and engagement of the engagement side frictional engagement element begins, the actual gear ratio Gr varies (downshift). Accordingly, acceleration of the vehicle decreases.

When the actual gear ratio Gr reaches the inertia phase start determination gear ratio Gr_St at a time t3, torque phase control is completed in the engagement side frictional engagement element, and as a result, the oil pressure of the engagement side frictional engagement element rises gradually along a preset gradient. Further, replacement control is completed and inertia phase control is started in the disengagement side frictional engagement element.

When the actual gear ratio Gr reaches the inertia phase end determination gear ratio Gr_End at a time t4, inertia phase control is completed and shift completion phase control is started in the engagement side frictional engagement element. As a result, the oil pressure of the engagement side frictional engagement element increases further, leading to an increase in the actual gear ratio Gr.

When the actual gear ratio Gr reaches the gear position gear ratio Grn at a time t5 and the fourth time T4 elapses after the actual gear ratio Gr reaches the gear position gear ratio Grn, the shift completion phase is terminated at a time t6, whereby the shift is complete.

On the other hand, when the lockup clutch LUC is disengaged such that a coasting downshift is performed following a fuel cut recovery, or in other words when the lockup clutch LUC is disengaged, piston stroke control and undershoot prevention control are started at the time t0, and at a time t1', the oil pressure of the engagement side frictional engagement element is set at the initial oil pressure obtained by subtracting the offset oil pressure from the reference initial oil pressure. Hence, the initial oil pressure is smaller than the initial oil pressure during a fuel cut.

At a time t2', piston stroke control is completed and torque phase control is started in the engagement side frictional engagement element. As a result, the oil pressure of the engagement side frictional engagement element rises gradually from the initial oil pressure along a gradient set as the increase gradient following a fuel cut. Further, undershoot prevention control is completed and replacement control is started in the disengagement side frictional engagement element. The time t2' is greater than the time t2. Since the initial oil pressure is set by subtracting the offset oil pressure from the reference initial oil pressure so as to be lower than the initial oil pressure during a fuel cut, piston stroke control is performed for a longer amount of time when the lockup clutch LUC is disengaged to ensure that the piston stroke is completed.

From a time t3' onward, the processing is similar to that of the time t3 onward when the lockup clutch LUC is engaged.

Effects of this embodiment of the invention will now be described.

When a downshift is performed in the coasting state following a fuel cut recovery, the initial oil pressure of the engagement side frictional engagement element is controlled to a lower oil pressure than the initial oil pressure when a fuel cut is underway. Thus, during a coasting downshift following a fuel cut recovery, in which output shaft torque variation relative to the output shaft torque is large, the piston stroke can be performed at a low oil pressure even when variation occurs in the actual oil pressure or learning control does not converge, and therefore shift shock generated when the oil pressure of the engagement side frictional engagement element increases can be prevented, enabling a reduction in an unpleasant sensation experienced by the driver. Further, in the case of a downshift performed during a fuel cut, in which output shaft torque variation relative to the output shaft torque is small, the oil pressure is higher than the oil pressure of the post-fuel cut recovery state, and therefore the piston stroke is accelerated in comparison with the post-fuel cut recovery state. As a result, a delay in the oil pressure increase of the engagement side frictional engagement element can be prevented, and a situation in which the engine rotation speed Ne decreases during the shift such that a fuel cut recovery is executed can be prevented. Hence, shock and a reduction in fuel efficiency occurring when a fuel cut recovery is executed can be suppressed.

Further, when a downshift is performed in the coasting state, a determination is made as to whether the fuel cut state or the post-fuel cut recovery state is established on the basis of the engagement/disengagement state of the lockup clutch using the engine rotation speed directly or using a signal indicating the engagement state of the lockup clutch, and it is therefore possible to predict an imminent fuel cut recovery when in actuality a fuel cut is underway in the engine. Hence, the engagement side friction element can be engaged at an appropriate oil pressure even when a fuel cut recovery is executed due to a reduction in the engine rotation speed Ne during piston stroke control, and as a result, shift shock can be prevented.

Further, when a downshift is performed in the coasting state, the oil pressure increase gradient in the post-fuel cut recovery state is reduced below the oil pressure increase gradient in the fuel cut state, and therefore shift shock felt by the driver in the post-fuel cut recovery state can be reduced. Furthermore, when a fuel cut is underway, a situation in which a fuel cut recovery is executed due to a reduction in the engine rotation speed Ne can be prevented. Hence, shock and a reduction in fuel efficiency occurring when a fuel cut recovery is executed can be suppressed.

This invention is not limited to the embodiment described above, and includes various modifications and improvements within the scope of the technical spirit thereof. For example, in this embodiment, the oil pressure of the period of the piston stroke control that extends from immediately after pre-charge control to the start of the torque phase is described as a constant value, but may be raised on a predetermined gradient. In this case, the predetermined gradient is preferably set such that with respect to the oil pressure of the period that extends from immediately after pre-charge control to the start of the torque phase, the command oil pressure following a fuel cut recovery is lower than the command oil pressure during a fuel cut. Moreover, in this embodiment, the determination as to whether the fuel cut state or the post-fuel cut recovery state is established is made on the basis of the engagement state of the lockup clutch, but the invention is not limited to this embodiment.

This application claims priority from Japanese Patent Application 2008-227057, filed Sep. 4, 2008, which is incorporated herein by reference in its entirety.

What is claimed is:

1. A control device for a vehicle having an automatic transmission which includes a plurality of friction elements, switches between a plurality of gear positions by using an oil pressure to set a part of the friction elements in an engaged state and the remainder of the friction elements in a disengaged state, shifts a rotation speed of an input shaft, and outputs the shifted rotation speed from an output shaft, comprising:
 a downshift determining unit that determines whether to perform a downshift;
 a fuel cut determining unit that determines whether the downshift is to be performed in a fuel cut state or a post-fuel cut recovery state when the downshift is performed in a coasting state; and
 an oil pressure control unit that performs a piston stroke in an engagement side friction element when the downshift is performed in the coasting state by increasing a command oil pressure of the engagement side friction element to a first oil pressure and then setting the command oil pressure at a second oil pressure that is lower than the first oil pressure,
 wherein the oil pressure control unit controls the second oil pressure to be lower in the post-fuel cut recovery state than in the fuel cut state.

2. The control device for a vehicle as defined in claim 1, further comprising:
 an engine rotation speed detecting unit that detects an engine rotation speed;
 an engine control unit which, in the coasting state, performs a fuel cut when the engine rotation speed is equal to or higher than a first rotation speed and performs a fuel cut recovery when the engine rotation speed is lower than the first rotation speed; and
 a coasting lockup control unit which, in the coasting state, engages a lockup clutch when the engine rotation speed is equal to or higher than a second rotation speed, which is greater than the first rotation speed, and disengages the lockup clutch when the engine rotation speed is lower than the second rotation speed,
 wherein, when the downshift is performed in the coasting state and the engine rotation speed is lower than the second rotation speed, the fuel cut determining unit determines that the post-fuel cut recovery state is established.

3. The control device for a vehicle as defined in claim 1, wherein the oil pressure control unit engages the engagement side friction element by raising a command oil pressure of the engagement side friction element from the second oil pressure along a predetermined increase gradient, and
 when the downshift is performed in the coasting state, the increase gradient upon determination of the post-fuel cut recovery state is smaller than the increase gradient in the fuel cut state.

4. The control device for a vehicle as defined in claim 2, wherein the fuel cut determining unit determines whether the fuel cut state or the post-fuel cut recovery state is established on the basis of an engagement/disengagement state of the lockup clutch.

5. A control method for a vehicle having an automatic transmission which includes a plurality of friction elements, switches between a plurality of gear positions by using an oil pressure to set a part of the friction elements in an engaged state and the remainder of the friction elements in a disengaged state, shifts a rotation speed of an input shaft, and outputs the shifted rotation speed from an output shaft, comprising:
 determining whether to perform a downshift;
 determining whether the downshift is to be performed in a fuel cut state or a post-fuel cut recovery state when the downshift is performed in a coasting state; and
 performing a piston stroke in an engagement side friction element when the downshift is performed in the coasting state by increasing a command oil pressure of the engagement side friction element to a first oil pressure and then setting the command oil pressure at a second oil pressure that is lower than the first oil pressure,
 wherein the second oil pressure in the post-fuel cut recovery is controlled by lower pressure than the second oil pressure in the fuel cut state.

6. The control method for a vehicle as defined in claim 5, further comprising:
 detecting an engine rotation speed;
 performing a fuel cut when the engine rotation speed is equal to or higher than a first rotation speed in the coasting state, and performing a fuel cut recovery when the engine rotation speed is lower than the first rotation speed in the coasting state; and
 engaging a lockup clutch when the engine rotation speed is equal to or higher than a second rotation speed, which is greater than the first rotation speed in the coasting state, and disengaging the lockup clutch when the engine rotation speed is lower than the second rotation speed in the coasting state,
 wherein, when the downshift is performed in the coasting state and the engine rotation speed is lower than the second rotation speed, a vehicle state is determined as the post-fuel cut recovery state.

7. The control method for a vehicle as defined in claim 5, wherein a command oil pressure of the engagement side friction element is raised from the second oil pressure along a predetermined increase gradient, and when the downshift is performed in the coasting state, the increase gradient upon determination of the post-fuel cut recovery state is smaller than the increase gradient in the fuel cut state.

8. The control method for a vehicle as defined in claim 6, wherein a determination as to whether the fuel cut state or the post-fuel cut recovery state is established is made on the basis of an engagement/disengagement state of the lockup clutch.

9. A control device for a vehicle having an automatic transmission which includes a plurality of friction elements, switches between a plurality of gear positions by using an oil pressure to set a part of the friction elements in an engaged state and the remainder of the friction elements in a disengaged state, shifts a rotation speed of an input shaft, and outputs the shifted rotation speed from an output shaft, comprising:

downshift determining means for determining whether to perform a downshift;

fuel cut determining means for determining whether the downshift is to be performed in a fuel cut state or a post-fuel cut recovery state when the downshift is performed in a coasting state; and oil pressure control means for performing a piston stroke in an engagement side friction element when the downshift is performed in the coasting state by increasing a command oil pressure of the engagement side friction element to a first oil pressure and then setting the command oil pressure at a second oil pressure that is lower than the first oil pressure, wherein the oil pressure control means controls the second oil pressure to be lower in the post-fuel cut recovery state than in the fuel cut state.

10. The control device for a vehicle as defined in claim 9, further comprising:

engine rotation speed detecting means for detecting an engine rotation speed;

engine control means which, in the coasting state, perform a fuel cut when the engine rotation speed is equal to or higher than a first rotation speed and perform a fuel cut recovery when the engine rotation speed is lower than the first rotation speed; and coasting lockup control means which, in the coasting state, engages a lockup clutch when the engine rotation speed is equal to or higher than a second rotation speed, which is greater than the first rotation speed, and disengages the lockup clutch when the engine rotation speed is lower than the second rotation speed, wherein, when the downshift is performed in the coasting state and the engine rotation speed is lower than the second rotation speed, the fuel cut determining means determines that the post-fuel cut recovery state is established.

11. The control device for a vehicle as defined in claim 9, wherein the oil pressure control means engages the engagement side friction element by raising a command oil pressure of the engagement side friction element from the second oil pressure along a predetermined increase gradient, and when the downshift is performed in the coasting state, the increase gradient upon determination of the post-fuel cut recovery state is smaller than the increase gradient in the fuel cut state.

12. The control device for a vehicle as defined in claim 10, wherein the fuel cut determining means determines whether the fuel cut state or the post-fuel cut recovery state is established on the basis of an engagement/disengagement state of the lockup clutch.

\* \* \* \* \*